United States Patent [19]

Hill

[11] Patent Number: 4,557,653

[45] Date of Patent: Dec. 10, 1985

[54] CAPTIVE PANEL SCREW

[75] Inventor: Royce W. Hill, Flippin, Ark.

[73] Assignee: Micro Plastics, Inc., Flippin, Ark.

[21] Appl. No.: 641,386

[22] Filed: Aug. 16, 1984

Related U.S. Application Data

[63] Continuation of Ser. No. 310,376, Oct. 13, 1981, Pat. No. 4,509,890.

[51] Int. Cl.[4] .............................................. F16B 39/00
[52] U.S. Cl. .................................. 411/337; 411/107; 411/182; 411/509; 10/155 A
[58] Field of Search ................... 411/84, 85, 103, 107, 411/119, 142, 173–175, 183, 186, 166, 167, 337, 349, 360, 361, 352, 371, 508–510, 541, 521, 522, 907, 908; 10/155 A

[56] References Cited

U.S. PATENT DOCUMENTS

| | | | |
|---|---|---|---|
| 2,115,495 | 4/1938 | Mapelsden | 411/907 |
| 3,126,935 | 3/1964 | Tuozzo | 411/361 |
| 3,476,165 | 11/1969 | Vaughn | 411/103 |
| 3,782,437 | 1/1974 | Seckerson | 411/107 |
| 4,274,460 | 6/1981 | Egner | 411/424 |

FOREIGN PATENT DOCUMENTS 2228030  6/1972  Fed. Rep. of Germany ...... 411/337

Primary Examiner—Kenneth J. Dorner
Assistant Examiner—Neill Wilson
Attorney, Agent, or Firm—Stephen D. Carver, Ltd.

[57] ABSTRACT

A unitary, non-metallic captive panel screw adapted to be inserted in a suitable orifice defined in a workpiece includes a head and an outwardly projecting, multi-section shaft. A shaft spacer section has a diameter less than the diameter of the head, and extends a predetermined length from the head, terminating in a spaced-apart shoulder portion. A relief section of the shaft extends axially outwardly from the spacer section, and is substantially smaller both in diameter and length than the spacer section. A terminal threaded section having a diameter smaller than either the relief section or the spacer section is adapted to threadably receive a suitable nut whereby to secure a mechanical component in spaced relation relative to a workpiece. An integral generally frustro conical snap-fit flange section divides the terminal threaded section from the relief section, and includes a plurality of radially spaced-apart wedge shaped members extending radially outwardly from the axis of the screw. The wedge members are adapted to yieldably deform rearwardly toward the relief section in response to installation pressure, and to snugly snap back into restraining engagement with the workpiece when the flange section clears the orifice.

1 Claim, 7 Drawing Figures

U.S. Patent  Dec. 10, 1985  4,557,653
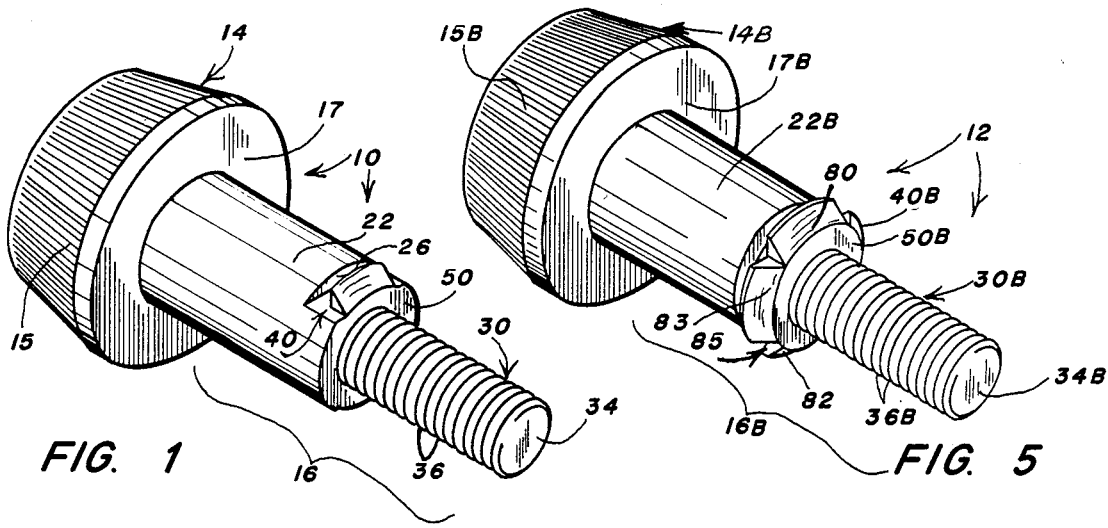
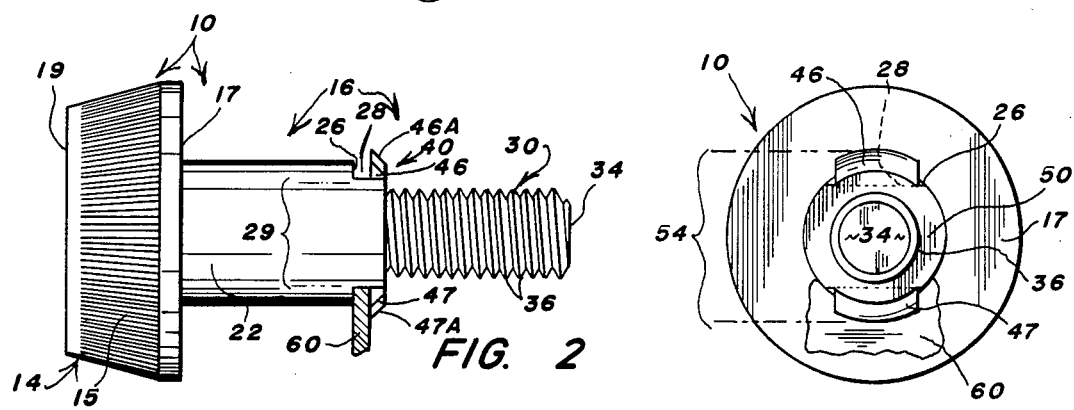
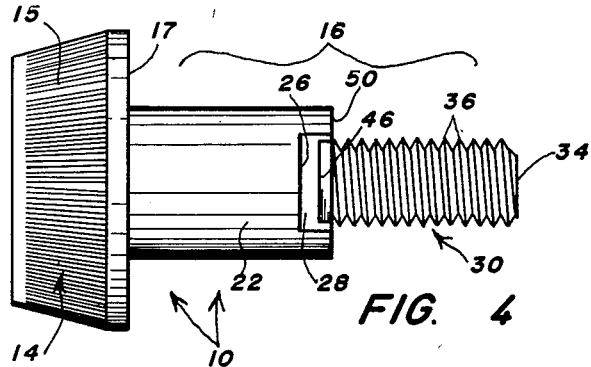
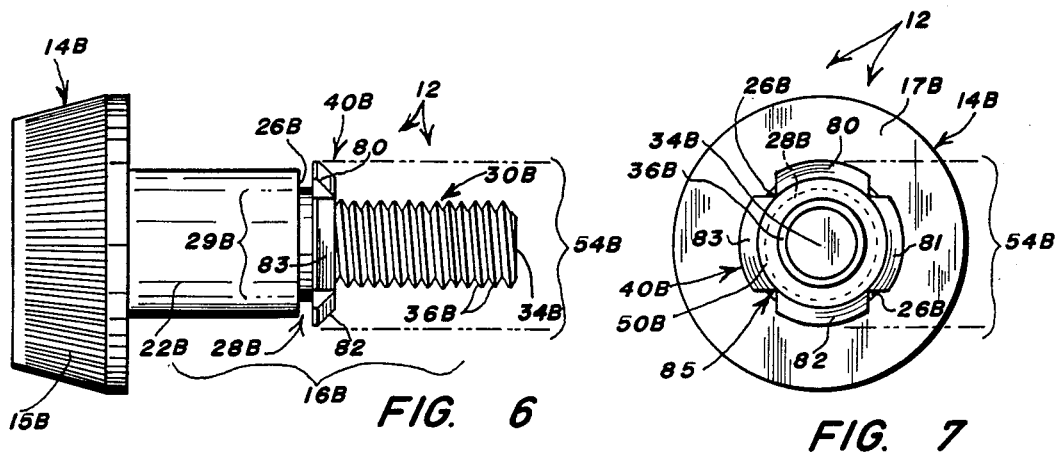

4,557,653

CAPTIVE PANEL SCREW

This is a continuation of application Ser. No. 310,376, filed on Oct. 13, 1981, now U.S. Pat. No. 4,509,890.

BACKGROUND OF THE INVENTION

This invention relates generally to captive panel hardware. More particularly, the present invention is concerned with a unitary, preferably non-metallic, captive panel screw.

In the prior art a plurality of captive panel devices have been proposed. Basically captive panel hardware is employed to provide various forms of spacers, bosses or anchors to which mechanical structure such as printed circuit boards, panels, tie downs or other terminals or accessories may be attached or secured. As will be appreciated by those skilled in the art, rapid installation of captive panel hardware during assembly, for example, of electro-mechanical components, may greatly reduce labor and tooling costs.

In the past a variety of captive screw structures have been proposed. For example, relevant prior art known to me comprises U.S. Pat. Nos. 3,571,904; 3,346,032; and 3,560,132. The foregoing patents relate to multi-component structures which are adapted to be captivated relative to a suitable orifice provided in a workpiece. However, captivation occurs in response to the assembly of a variety of usually coaxially interfitted parts which must be carefully assembled for successful installation.

Besides the obvious labor related cost inefficiencies of multi-component captive panel assemblies, the use of metallic parts generally results in the necessity of several operations to successfully install or manufacture the devices. For example, certain metal pieces must be flared during a secondary installation operation. During such operation damage often occurs at the hands of inexperienced assembly personnel. Also, the use of metallic components generally is disadvantageous in conjunction with the assembly of electrical or electronic apparatus. Moreover, the metallic colors of conventional captive panel hardware often clash aesthetically with the end product.

SUMMARY OF THE INVENTION

The present invention comprises a unitary captive panel screw adapted to be snap fitted into a suitable orifice provided in a conventional workpiece, whereby to provide a secure, bosslike, threaded stud adapted to receive and thus mount a variety of components.

Preferably the captive panel screw is of a molded plastic, one-piece design which includes a head having a diameter substantially greater than the dimensions of the orifice in which the screw is to be secured, and an integral, elongated shaft which projects axially outwardly from the head. The shaft is divided into a plurality of cooperative, axially aligned, integral sections.

A spacer section mated with the head has a diameter less than the diameter of the head, and the spacer section terminates in a well defined, spaced-apart shoulder portion. A lower diameter relief section extends axially outwardly from the spacer. A terminal threaded section is adapted to threadably receive a suitable nut whereby to mount, brace, or secure a desired component.

A separate flange section divides the terminal section from the relief section. Preferably the flange is in the form of a tapered, frusto-conical member including a plurality of separate, radially spaced-apart wedges. The operative diameter of the flange section is greater than the diameter of the spacer section or the intermediate relief section. The flange section is adapted to yieldably deform rearwardly toward the relief section in response to penetration of the suitable orifice during installation of the captive screw.

Thus an object of the present invention is to provide a low cost, one piece, captive panel screw.

Another object of the present invention is to provide a captive panel screw ideally adapted for use in electrical, eletronic, and electro-mechanical applications.

Another object of the present invention is to provide a captive panel screw which does not require a separate threading operation, as is the case with previously patented metallic captive hardware.

A still further object of the present invention is to provide a captive panel screw with a reliable snap-in mounting system.

Yet another object of the present invention is to reduce assembly difficulties often encountered in the mass production of electrical, electro-mechanical or electronic devices.

A still further object of the present invention is to provide a captive panel screw of the character described adapted to cooperate with the designers of equipment in enhancing the structural appearance or aesthetic beauty of assembled components.

These and other objects and advantages of the present invention along with features of novelty appurtenant thereto will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 1 is an isometric view of a captive panel screw constructed in accordance with the teachings of the present invention;

FIG. 2 is a side elevational view of the captive panel screw shown in FIG. 1, with portions of a workpiece in which the screw has been captivated shown in section;

FIG. 3 is a rear plan view of the screw shown in FIGS. 1 and 2, taken from a position generally to the right of FIG. 2, with a portion of the workpiece in which the screw has been captivated illustrated in broken away form;

FIG. 4 is a top plan view of the screw shown in FIGS. 1-3;

FIG. 5 is an isometric view of a preferred, alternative embodiment of a captive panel screw constructed in accordance with the teachings of the present invention;

FIG. 6 is a top plan view of the alternative captive panel screw illustrated in FIG. 5; and, FIG. 7 is a rear plan view of the alternative captive panel screw illustrated in FIGS. 5 and 6, the view taken generally from a position to the right of FIG. 6.

DETAILED DESCRIPTION OF THE DRAWINGS

Referring now to the drawings, the captive panel screw illustrated in FIGS. 1-4 has been generally designated by the reference numeral 10. A preferred captive panel screw, generally designated by the reference numeral 12, is illustrated in FIGS. 5-7. Both captive panel screws 10, 12 are adapted to be snap fitted into a suitable orifice defined in a workpiece such as a metallic cabinet panel, housing or the like. Once snap fitted into the desired orifice, a variety of desired items may be mounted to the captive panel screw with a conventional nut, as will hereinafter be described.

Referring now to FIGS. 1-4, captive panel screw 10 comprises a generally cylindrical head 14 which is integral with an elongated shaft 16, which projects axially rearwardly outwardly from rear face 17 of head 14. Front face 19 of head 14 is of somewhat reduced diameter from rear face 17. The intermediate periphery 15 of head 14 is preferably knurled to provide a suitable gripping surface to the assembler.

Shaft assembly 16 comprises a cylindrical spacer section 22 which extends a predetermined length outwardly from head face 17, and which has a diameter less than the diameter of the head 14. The spacer section 22 includes notched shoulder portion 26, which adjoins a relief section of the shaft 16, generally designated by the reference numeral 28. Relief section 28 has a minor dimension (FIG. 3) defined between the opposite, parallel flat surfaces thereof which is smaller than the diameter of spacer section 22 or head 14. The actual cross section of relief section 28 thus has two opposed parallel flat sides and two spaced-apart opposed arcuate sides. The length of the relief section 28, as best viewed in FIG. 2, is substantially less than the length of spacer section 22.

A terminal, threaded shaft section 30 projects axially rearwardly from the screw, terminating in a rear end 34. Threads 36 formed during the molding process enable a desired, properly threaded nut to be assembled to section 30 whereby to secure a desired component to screw 10.

A flange section of shaft 16 has been generally designated by the reference numeral 40. Flange section 40 is located between threaded section 36 and relief section 28, and it is of a dimension somewhat greater than the diameter of spacer section 22. Flange portion 28 includes a pair of generally wedge shaped members 46, 47 which project radially outwardly from the outer surface 50 of the flange section 28. Flange wedges 46, 47 are spaced 180 degrees apart. As best viewed in FIG. 3, the effective diameter 54 of the flange section 40 is greater than the diameter of relief section 28 or spacer section 22. As best viewed in FIG. 2, the outermost edges 46A, 47A of wedges 46, 47 respectively are angularly tapered, so that the working diameter of the flange section 40 decreases gradually towards terminal threaded section 30.

In operation a suitable orifice will be provided for insertion of captive panel screw 10. Such an orifice would be of generally rectangular dimensions, one side of which must be substantially equal to the diameter of spacer section 22; the other side must be less than the diameter of spacer section 22 but slightly greater than the diameter 29 of the relief section 28. Once threaded section 30 is inserted into the orifice, continued pressure by the assembler will deflect wedges 46, 47, whereby the flange section will be rearwardly, yieldably deformed toward relief section 28. When the flange section "clears" the suitable orifice, the screw 10 will be captivated within the orifice. For example, screw 10 may be captivated within a panel 60, with the panel 60 retained between the flange section 40 and the shoulder 26 of the spacer section 22.

With reference now to FIGS. 5-7, a preferred captive panel screw has been previously designated by the reference numeral 12. In the discussion hereinafter set forth, similar components described previously in conjunction with FIGS. 1-4 will be similarly numbered, but with the addition of the suffix "B". Thus, screw 12 includes a head 14B which is integral with a rearwardly projecting axially aligned shaft structure 16B. Head 14B includes rear face 17B and knurled periphery 15B. Similarly, shaft structure 16B includes a spacer section 22B, a relief section 28B, a terminal, threaded section 30B, and an intermediate flange section 40B which divides the relief section 28B (FIG. 6) from the threaded section 30B.

Threaded terminal section 30B includes a plurality of desired threads 36B which are formed in the molding operation as before. Similarly, threaded end 30B terminates in screw end 34B. Spacer section 22B extends rearwardly from head surface 17B and terminates in a shoulder portion 26B which, unlike its counterpart 26 (FIGS. 1-4) is of a uniform diameter. Similarly, relief section 28B, is of a uniform diameter, being circular in cross section (as illustrated in dashed lines in FIG. 7).

However, the flange section 40B of screw 12 is somewhat different from previously discussed flange section 40. As will best be noted from inspection of FIGS. 5 and 7, the flange section 40B comprises a symmetrical arrangement of wedge shaped members 80-83 which are radially disposed at equal spaced-apart intervals about the periphery of the shaft 16B. Each of these members 80-83 is separated from its neighbor by small voids 85 provided to ease in the deformation of the flange section 40B during insertion of screw 12 into a suitable circular orifice. It will also be apparent that the flange section 40B is of a generally frusto-conical geometry, the diameter of which decreases toward forward shoulder 50B of the flange section 40B (which adjoins centered, axially outwardly projecting threaded portion 30B). However, the effective working diameter 54B of the flange section 40B is substantially greater than the diameter of spacer shaft section 22B, and thus a metallic planar portion snugly received between flange section 40B and the rear shoulder 26B of spacer shaft 22B will be firmly retained therebetween, whithin the deformation or relief region 28B.

It will be apparent from the designs of screws 10 and 12 that they may advantageously be employed in a variety of applications. When "snap fitted" into a suitable orifice, the screw 10 or 12 will be retained therewithin and subsequent axial displacement will not be possible. Subsequent attachment of a suitable nut (not shown) will secure a part or part(s) against shoulder 50 or 50B. Screws 10 or 12 may be employed in offset designs, wherein heads 14 or 14B are received, for example, in a counterbored panel orifice, or through a suitable orifice provided in a separate panel spaced from panel 60. Alternatively, certain offset or multi panel applications will result in the penetration of a suitable orifice by shaft section 22 or 22B, with head surface 17 or 17B resting against a planar surface spaced-apart, for example, from mounting surface 60.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A one-piece, flexible plastic captive panel screw adapted to be fitted through a first orifice in a first workpiece and to secure multiple workpieces in generally parallel alignment, the screw comprising:

- a rigid head having a diameter substantially greater than the diameter of said first orifice, having a face adapted to firmly contact said first workpiece when said screw is properly installed, and having a predetermined thickness; and,
- an integral shaft assembly for penetrating both said first orifice and a second orifice defined in a second workpiece and aligned with said first orifice whereby to maintain said first and second workpieces in generally parallel, spaced-apart relation, said shaft assembly projecting axially outwardly from the center of said head, and said shaft assembly comprising:
  - an axially aligned, cylindrical spacer section having a diameter less than the diameter of said head, said spacer section having a predetermined length substantially greater than the thickness of said head and terminating in an integral shoulder portion spaced-apart from said head, said shoulder portion firmly abutting said second workpiece when said screw is properly installed;
  - a relief section integrally defined in said spacer section and adjoining said spacer shoulder portion, said relief section being of circular cross section and having a diameter less than the diameter of said spacer section diameter, said relief section having a length substantially less than said length of said spacer section, and said relief section operable to secure and substantially captivate a second workpiece;
  - a flange section having an outer effective diameter greater than the diameter of said spacer section but smaller than the diameter of said head, the flange section being of generally frustro-conical dimensions and comprising four radially spaced-apart wedges facilitating snap fitting of said screw into said second workpiece, said wedges extending perpendicularly outwardly from the axis of said captive panel screw and being disposed about the circular periphery of the flange section at equal radially spaced-apart intervals and separated from one another by distinct voids, angularly inclined outer faces of each wedge tapering toward a reduced diameter portion of said flange section;
  - a terminal threaded section threadably adapted to penetrate, once said screw is properly installed, a third and other orifice within desired subsequent workpieces to be fastened and operable to receive a suitable bolt, said terminal section having a diameter smaller than said spacer section diameter and smaller than said diameter of said relief section, said threaded section having a length substantially greater than said length of said relief section, said threaded section adapted to secure subsequent apertured workpieces in generally parallel alignment to said first and second workpieces; and,
  - a second shoulder dividing said flange section from said terminal threaded section, said second shoulder being flat and circular and having a diameter substantially equal to the diameter of said relief section and being parallel with and spaced apart from said face of said head.

* * * * *